US009712402B2

United States Patent
Rosensweig et al.

(10) Patent No.: US 9,712,402 B2
(45) Date of Patent: Jul. 18, 2017

(54) METHOD AND APPARATUS FOR AUTOMATED DEPLOYMENT OF GEOGRAPHICALLY DISTRIBUTED APPLICATIONS WITHIN A CLOUD

(71) Applicants: Elisha J. Rosensweig, Ra'anana (IL); Etti Shalev, Haifa (IL); Sharon Mendel, Tel Aviv (IL); Amir Rosenfeld, Raanana (IL); Sivan Barzilay, Tel-Aviv (IL); Ranny Haiby, Herzliya (IL); Itamar Eshet, Ramat Gan (IL)

(72) Inventors: Elisha J. Rosensweig, Ra'anana (IL); Etti Shalev, Haifa (IL); Sharon Mendel, Tel Aviv (IL); Amir Rosenfeld, Raanana (IL); Sivan Barzilay, Tel-Aviv (IL); Ranny Haiby, Herzliya (IL); Itamar Eshet, Ramat Gan (IL)

(73) Assignee: Alcatel Lucent, Boulogne-Billancourt (FR)

( * ) Notice: Subject to any disclaimer, the term of this patent is extended or adjusted under 35 U.S.C. 154(b) by 634 days.

(21) Appl. No.: 13/648,628

(22) Filed: Oct. 10, 2012

(65) Prior Publication Data

US 2014/0101300 A1    Apr. 10, 2014

(51) Int. Cl.
*G06F 15/173* (2006.01)
*H04L 12/24* (2006.01)
*G06F 9/50* (2006.01)

(52) U.S. Cl.
CPC ........ *H04L 41/5096* (2013.01); *G06F 9/5072* (2013.01); *G06F 2209/502* (2013.01)

(58) Field of Classification Search
CPC .... G06F 9/5072; G06F 9/5077; G06F 9/5061; G06F 9/5027; G06F 9/5088; H04L 67/10;
(Continued)

(56) References Cited

U.S. PATENT DOCUMENTS 6,185,619 B1 * 2/2001 Joffe ...................... G06F 9/505
709/223
6,728,750 B1 * 4/2004 Anderson ............... H04L 67/10
707/999.102

(Continued)

OTHER PUBLICATIONS

Colaner, "Alcatel-Lucent Unveils CloudBand—HotHardware," retrieved Oct. 9, 2012, from http://hothardware.com/News/Alcatel-Lucent-Unveils-CloudBand/.

(Continued)

*Primary Examiner* — Blake Rubin
(74) *Attorney, Agent, or Firm* — Kramer & Amado, P.C.

(57) ABSTRACT

Various exemplary embodiments relate to a method and related network node including one or more of the following: receiving, from a requesting device, a request to establish a component of an application; identifying a policy file associated with the application, wherein the policy file defines at least one segment for the application and defines at least one constraint for a first segment of the at least one segment; selecting the first segment for establishment of the component; selecting a location for establishment of the component, wherein the location is selected to be consistent with the at least one constraint; and establishing the component at the selected location.

15 Claims, 4 Drawing Sheets

(58) Field of Classification Search
CPC ... H04L 67/1014; H04L 67/34; H04L 67/306; H04L 67/32; H04L 67/1029; H04L 67/1021; H04L 41/5096
See application file for complete search history.

(56) References Cited

U.S. PATENT DOCUMENTS

| | | | | |
|---|---|---|---|---|
| 8,239,844 | B2* | 8/2012 | Stefansson et al. | 717/149 |
| 2003/0061247 | A1* | 3/2003 | Renaud | G06F 8/61 |
| 2005/0044268 | A1 | 2/2005 | Johnston-Watt | |
| 2005/0060380 | A1 | 3/2005 | Dearle et al. | |
| 2006/0070067 | A1* | 3/2006 | Lowery | G06F 9/5027 718/100 |
| 2007/0233698 | A1* | 10/2007 | Sundar | G06F 8/60 |
| 2008/0010631 | A1* | 1/2008 | Harvey | G06F 8/36 717/131 |
| 2008/0016198 | A1* | 1/2008 | Johnston-Watt et al. | 709/223 |
| 2010/0223385 | A1* | 9/2010 | Gulley | G06F 9/5027 709/226 |
| 2010/0268764 | A1* | 10/2010 | Wee et al. | 709/203 |
| 2010/0312809 | A1* | 12/2010 | Calder | G06F 9/5072 713/179 |
| 2010/0319004 | A1* | 12/2010 | Hudson | G06F 9/5072 719/313 |
| 2011/0016214 | A1* | 1/2011 | Jackson | G06F 9/5044 709/226 |
| 2011/0040552 | A1* | 2/2011 | Van Guilder | G06F 17/246 704/4 |
| 2011/0153697 | A1* | 6/2011 | Nickolov | G06F 9/4856 707/827 |
| 2011/0179162 | A1* | 7/2011 | Mayo et al. | 709/224 |
| 2011/0213691 | A1* | 9/2011 | Ferris et al. | 705/37 |
| 2011/0231696 | A1* | 9/2011 | Ji et al. | 714/3 |
| 2011/0231899 | A1* | 9/2011 | Pulier | G06F 9/45558 726/1 |
| 2011/0251992 | A1* | 10/2011 | Bethlehem et al. | 707/610 |
| 2011/0295999 | A1* | 12/2011 | Ferris et al. | 709/224 |
| 2012/0011077 | A1* | 1/2012 | Bhagat | G06F 21/554 705/317 |
| 2012/0016778 | A1* | 1/2012 | Salle | G06F 9/5072 705/27.1 |
| 2012/0030356 | A1* | 2/2012 | Fletcher | G06F 9/5094 709/226 |
| 2012/0042055 | A1* | 2/2012 | Agarwala et al. | 709/220 |
| 2012/0047239 | A1* | 2/2012 | Donahue et al. | 709/220 |
| 2012/0047265 | A1* | 2/2012 | Agarwala et al. | 709/226 |
| 2012/0060165 | A1* | 3/2012 | Clarke | G06F 9/5038 718/104 |
| 2012/0102572 | A1* | 4/2012 | Murakami et al. | 726/28 |
| 2012/0233625 | A1* | 9/2012 | Sabin | G06F 9/5072 718/105 |
| 2012/0278439 | A1* | 11/2012 | Ahiska et al. | 709/218 |
| 2012/0311575 | A1* | 12/2012 | Song | G06F 9/5077 718/1 |
| 2012/0317579 | A1* | 12/2012 | Liu | 718/104 |
| 2013/0007265 | A1* | 1/2013 | Benedetti et al. | 709/224 |
| 2013/0042003 | A1* | 2/2013 | Franco | H04L 67/1097 709/226 |
| 2013/0060933 | A1* | 3/2013 | Tung | G06F 11/3495 709/224 |
| 2013/0138619 | A1* | 5/2013 | Krislov | 707/695 |
| 2013/0205028 | A1* | 8/2013 | Crockett et al. | 709/226 |
| 2014/0047342 | A1* | 2/2014 | Breternitz et al. | 715/735 |

OTHER PUBLICATIONS

"Carrier Cloud | Alcatel-Lucent" retrieved Oct. 9, 2012, from http://www.alcatel-lucent.com/new-thinking/market-growth/cloud.html.
"CloudBand(TM)" retrieved Oct. 9, 2012, from http://www.alcatel-lucent.com/wps/portal/Solutions/detail?LMSG_CABINET=Solution_Product_Catalog&LMSG_CONTENT_FILE=Solutions/Solution2_Detail_000354.xml.
"Cloudify—The Open PaaS Stack for Any App—for Public Cloud, Private Cloud, Hybrid Cloud or Any Cloud | GigaSpaces" retrieved Oct. 9, 2012, from http://www.gigaspaces.com/cloudify-open-pass-stack.
"Brooklyn at a Glance | Cloudsoft" retrieved Oct. 9, 2012, from http://www.cloudsoftcorp.com/community/brooklyn/brooklyn-at-a-glance/.

* cited by examiner

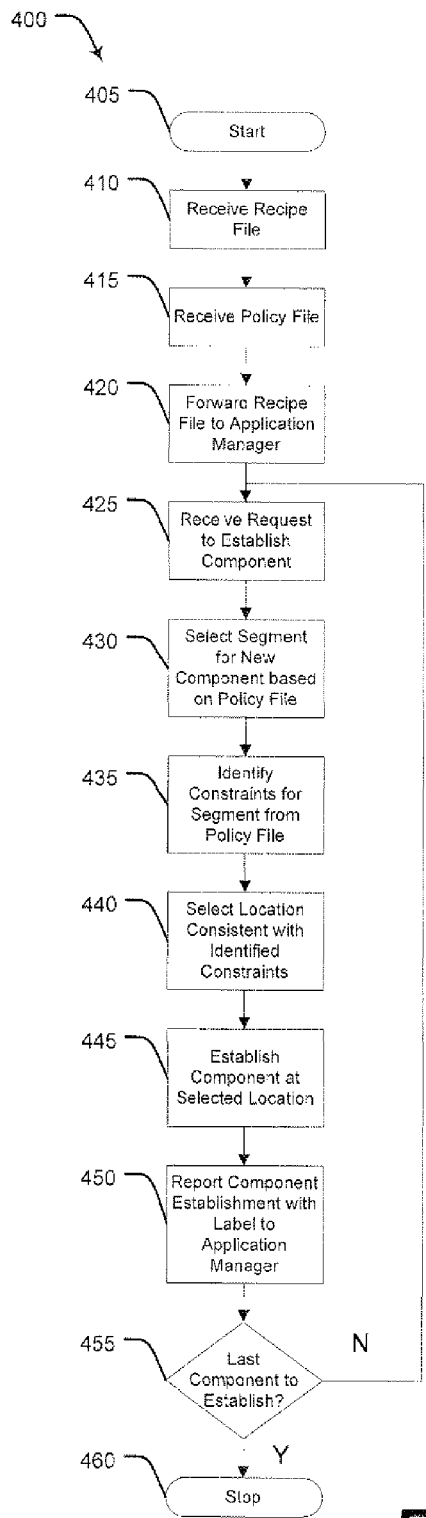
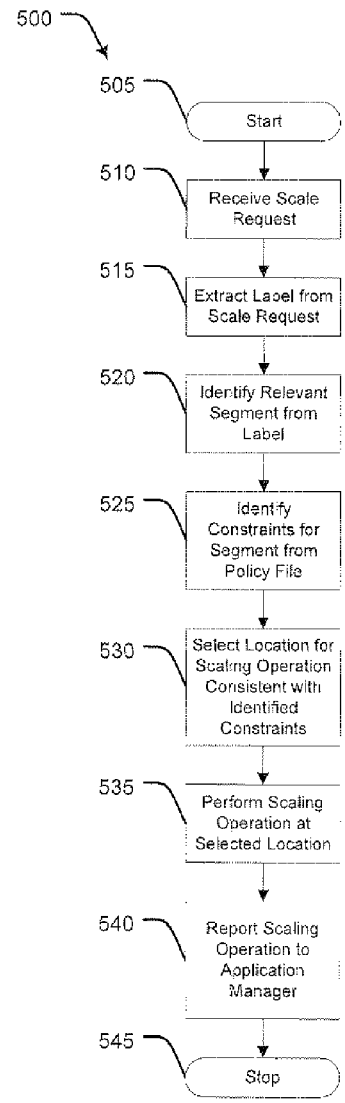
FIG. 4
FIG. 5

METHOD AND APPARATUS FOR AUTOMATED DEPLOYMENT OF GEOGRAPHICALLY DISTRIBUTED APPLICATIONS WITHIN A CLOUD

TECHNICAL FIELD

Various exemplary embodiments disclosed herein relate generally to cloud computing.

BACKGROUND

Many cloud operators currently host cloud services using a few large data centers, providing a relatively centralized operation. In such systems, a requestor may request the use of one or more resources from a cloud controller which may, in turn, allocate the requested resources from the data center for use by the requestor. This centralized operation, however, may not be well suited for hosting various types of applications, such as those with strict delay or reliability requirements.

Distributed data center architectures, on the other hand, provide a larger number of smaller data centers that may be geographically distributed. The data centers may remain under the control of one or more cloud controllers through a network such as the Internet or carrier networks. Under such a distributed system, the effects of network propagation delay may be reduced by providing cloud applications that are closer to various customers in terms of geographic or network distance than a centralized cloud may be able to provide.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a cloud controller for establishing a component of an application within a cloud, the method including: receiving, from a requesting device, a request to establish the component; identifying a policy file associated with the application, wherein the policy file defines at least one segment for the application and defines at least one constraint for a first segment of the at least one segment; selecting the first segment for establishment of the component; selecting a location for establishment of the component, wherein the location is selected to be consistent with the at least one constraint; and establishing the component at the selected location.

Various embodiments described herein relate to a cloud controller for establishing a component of an application within a cloud, the cloud controller including: a data storage; a processor in communication with the data storage, the processor being configured to: receive, from a requesting device, a request to establish the component; identify a policy file stored in the data storage and associated with the application, wherein the policy file defines at least one segment for the application and defines at least one constraint for a first segment of the at least one segment; select the first segment for establishment of the component; select a location for establishment of the component, wherein the location is selected to be consistent with the at least one constraint; and establish the component at the selected location.

Various embodiments described herein relate to a non-transitory machine-readable storage medium encoded with instructions for execution by a cloud controller for establishing a component of an application within a cloud, the medium including: instructions for receiving, from a requesting device, a request to establish the component; instructions for identifying a policy file associated with the application, wherein the policy file defines at least one segment for the application and defines at least one constraint for a first segment of the at least one segment; instructions for selecting the first segment for establishment of the component; instructions for selecting a location for establishment of the component, wherein the location is selected to be consistent with the at least one constraint; and instructions for establishing the component at the selected location.

Various embodiments are described wherein the at least one constraint includes an individual segment constraint that specifies a constraint for components belonging to the first segment.

Various embodiments are described wherein the at least one constraint includes an intra-segment constraint that specifies a constraint between at least two components belonging to the first segment.

Various embodiments are described wherein the at least one constraint includes an inter-segment constraint that specifies a constraint between at least one component belonging to the first segment and at least one component belonging to a second segment of the at least one segment.

Various embodiments additionally include reporting the establishment of the component to the requesting device along with a label; receiving, from the requesting device, a scale request including the label; identifying the first segment as being associated with the label; and performing a scaling operation with respect to the first segment.

Various embodiments additionally include after identifying the first segment: identifying the at least one constraint for the first segment from the policy file; and selecting a location for the scaling operation, wherein the location is selected to be consistent with the at least one constraint; wherein performing the scaling operation includes performing the scaling operation at the selected location.

Various embodiments additionally include receiving, from the requesting device, a request to establish an additional component for the application; selecting a second segment of the at least segment for establishment of the additional component; selecting a location for establishment of the additional component within the second segment; and establishing the additional component at the selected location.

Various embodiments are described wherein selecting the second segment includes selecting the second segment for establishment of the additional component based on the policy file definition of the at least segment and system-state information reflecting the establishment of the component within the first segment.

Various embodiments described herein relate to a method performed by a cloud controller for establishing an application within a cloud, the method including: receiving, from a user, a recipe file that defines a plurality of components for the application; receiving, from the user, a policy file that defines a plurality of segments for the application; and establishing the plurality of components within the cloud, wherein the components are established such that the application is distributed according to the plurality of segments.

Various embodiments described herein relate to a cloud controller for establishing an application within a cloud, the cloud controller including: a data storage; a processor in communication with the data storage, the processor being configured to: receive, from a user, a recipe file that defines a plurality of components for the application; receive, from the user, a policy file that defines a plurality of segments for the application; and establish the plurality of components within the cloud, wherein the components are established such that the application is distributed according to the plurality of segments.

Various embodiments described herein relate to a machine-readable storage medium encoded with instructions for execution by a cloud controller for establishing an application within a cloud, the medium including: instructions for receiving, from a user, a recipe file that defines a plurality of components for the application; instructions for receiving, from the user, a policy file that defines a plurality of segments for the application; and instructions for establishing the plurality of components within the cloud, wherein the components are established such that the application is distributed according to the plurality of segments.

Various embodiments are described wherein the policy file further defines at least one constraint with respect to a first segment of the plurality of segments and establishing the plurality of components such that the application is distributed according to the plurality of segments includes: assigning a first component to the first segment; and establishing the first component in a location consistent with the at least one constraint.

Various embodiments are described wherein: the at least one constraint specifies a geographic area in which components assigned to the first segment are established; and establishing the first component in a location consistent with the at least one constraint includes establishing the component within the geographic area.

Various embodiments are described wherein: the at least one constraint specifies an affinity between components assigned to the first segment; and establishing the first component in a location consistent with the at least one constraint includes establishing the first component at a location selected to be close to at least one other component assigned to the first segment.

Various embodiments are described wherein: the at least one constraint specifies an anti-affinity between the first segment and a second segment of the plurality of segments; and establishing the first component in a location consistent with the at least one constraint includes establishing the first component at a location selected to be far from at least one other component assigned to the second segment.

Various embodiments are described wherein the policy file specifies: a first proportion associated with a first component of the plurality of components and a first segment of the plurality of segments; and a second proportion associated with the first component and a second segment of the plurality of segments.

Various embodiments are described wherein establishing the plurality of components such that the application is distributed according to the plurality of segments includes: establishing a first number of the first component within the first segment; and establishing a second number of the first component within the second segment, wherein the first number and the second number are chosen based on the first proportion and the second proportion.

Various embodiments additionally include forwarding the recipe file to an application manager; storing the policy file at the cloud controller; and receiving, from the application manager, a request to establish a component, wherein establishing the plurality of components includes establishing the component based on the received request and the stored policy file.

BRIEF DESCRIPTION OF THE DRAWINGS

In order to better understand various exemplary embodiments, reference is made to the accompanying drawings, wherein:

FIG. 4 illustrates an exemplary method for establishing an application within the cloud; and FIG. 5 illustrates an exemplary method for scaling an application within the cloud.

To facilitate understanding, identical reference numerals have been used to designate elements having substantially the same or similar structure or substantially the same or similar function.

DETAILED DESCRIPTION

Figure 1:
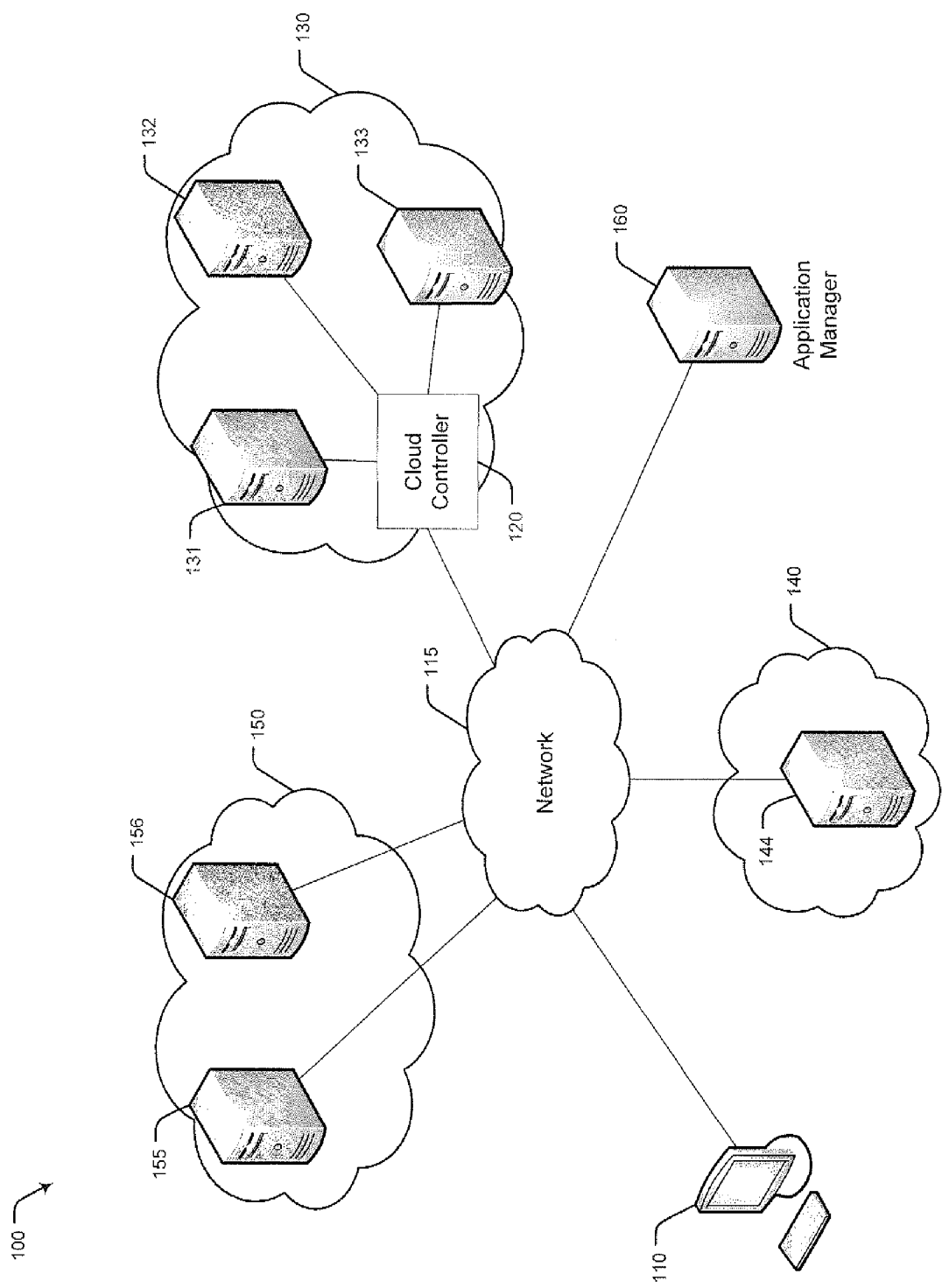
FIG. 1 illustrates an exemplary network for providing cloud resources.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments may be combined with one or more other embodiments to form new embodiments.

While various methods may enable a user to define the components to be deployed for a distributed cloud application, such methods do not further enable the user to specify, or otherwise influence, where the components will be established. As such, users may not be empowered to leverage the distributed nature of the cloud to reduce bottlenecks based on knowledge of the customer base and other information. Accordingly, there exists a need for a system that may automatically deploy a distributed cloud application while providing a user with influence over how the application is distributed among the cloud.

In accordance with the foregoing, various embodiments described herein enable a user to specify multiple "segments" across which a cloud application will be distributed. The user may also specify geographic areas in which components of each such segment exists and the components of an application that will belong to each segment. In this manner, the user is provided with influence over where each component forming a part of the application is placed geographically. Various additional features and implementation details will be described in greater detail with respect to the figures below.

Referring now to the drawings, in which like numerals refer to like components or steps, there are disclosed broad aspects of various exemplary embodiments.

FIG. 1 illustrates an exemplary cloud architecture 100 for providing cloud resources. The cloud architecture 100 may implement a networked cloud architecture and may include a client device 110, a network 115, a cloud controller 120, data centers 130, 140, 150, and an application manager 160.

The client device 110 may be any device configured to utilize one or more cloud resources. In various embodiments, the client device 110 may be a desktop computer, laptop, tablet, mobile device, server, or blade. The client device 110 may communicate with other devices, such as the cloud controller 120, via the network 115. The client device 110 may transmit a request for one or more cloud resources to the cloud controller 120. For example, the client device 110 may request the use of one or more virtual machines (VMs), groups of VMs, storage devices, or memory. Additional types of cloud resources will be apparent. The client device 110 may represent a device of a user that requests the deployment of a distributed cloud application from the cloud controller 120 or the client device 110 may represent a customer of such a user that requests the use of one or more components of such a distributed cloud application by directly communicating with such resources 131, 132, 133, 144, 155, 166. It will be apparent that multiple additional client devices (not shown) may be in communication with the network 115 and such additional client devices may belong to additional users and customers.

The network 115 may be any network of devices or transmission media capable of enabling communication between the various devices of the exemplary cloud architecture 100. For example, the network 115 may include numerous devices configured to exchange and route data packets toward various destinations. In various embodiments, the network 115 may include the Internet or one or more carrier networks.

The cloud controller 120 may be a device configured to control the operations of a networked cloud. The cloud controller 120 may include various hardware such as a storage device, memory, or one or more processors, as will be described in greater detail below with respect to FIG. 3. As used herein, the term "processor" will be understood to encompass a variety of devices such as microprocessors, field-programmable gate arrays (FPGAs), application-specific integrated circuits (ASICs), and other similar processing devices. In various embodiments, the cloud controller 120 may include, for example, a server, a blade, a personal computer, a laptop, a tablet, or a mobile device. In some such embodiments, the cloud controller 120 may be a virtual machine that utilizes cloud resources such as, for example, the hardware resources provided by cloud devices 131, 132, 133. The cloud controller 120 may reside at a data center, such as data center 130, or may reside elsewhere. The cloud controller 120 may perform various cloud management functions, including management of cloud resource allocation. As such, the cloud controller 120 may receive requests for the establishment of cloud applications from client devices such as the client device 110. Upon receiving such requests, the cloud controller 120 may allocate requested resources from one or more of the cloud devices 131, 132, 133, 144, 155, 156, for use by client devices. In various embodiments, the exemplary cloud architecture 100 may include multiple cloud controllers (not shown). Various techniques for coordinating the operation of multiple cloud controllers will be apparent.

The data centers 130, 140, 150 may each be locations supporting one or more devices that provide cloud resources. For example, data center 130 may host cloud devices 131, 132, 133; data center 140 may host cloud device 144; and data center 150 may host cloud devices 155, 156. The data centers 130, 140, 150 may be geographically distributed or may be situated at different network distances from the client device 110. For example, the client device 110 may be located in Washington, D.C., data center 140 may be located in Chicago, data center 150 may be located in Paris, and data center 130 may be located in Tokyo. According to this example, the client device 110 may experience less network latency when communicating with data center 140 than when communicating with data center 130. It will be apparent that the cloud architecture 100 may include numerous additional data centers (not shown) and that each data center may include any number of cloud devices.

Each of cloud devices 131, 132, 133, 144, 155, 156 may be a device configured to provide cloud resources for use by client devices. In various embodiments, each of the cloud devices 131, 132, 133, 144, 155, 156 may be a desktop computer, laptop, tablet, mobile device, server, or blade. As such, the cloud devices 131, 132, 133, 144, 155, 156 may include various hardware such as, for example, storage devices, memory, or one or more processors. The cloud devices 131, 132, 133, 144, 155, 156 may be configured to provide processing, storage, memory, VMs, or groups of VMs for use by client devices such as the client device 110.

In various embodiments, such as the embodiment illustrated in FIG. 1, the cloud controller 120 may interface with an application manager 160 to deploy and subsequently scale a cloud application with demand. The application manager 160 may be, for example, a desktop computer, laptop, tablet, mobile device, server, or blade and may include a virtual machine. The application manager 160 may receive a "recipe file" from the client 110 or cloud controller 120. As used herein, the term "recipe file" will be understood to refer to any definition of the components to be deployed for an application. Further, the term "file" will be understood to refer not only to a file as conventionally known, but also any other storage structure suitable for holding such a definition. For example, a recipe file may specify that an application includes front-end web servers and a database server for each front-end web server. Various alternative applications to be defined by a recipe file will be apparent. Upon receiving a recipe file, the application manager 160 may interpret the recipe file and subsequently request that the cloud controller 120 establish the components that make up the application defined in the recipe file. Thereafter, the application manager 160 may monitor the load placed on the various components by customer traffic and request the cloud controller 120 scale up components that are overloaded or scale down components that are underutilized. For example, the application manager 160 may determine that a front-end web server belonging to the application is overloaded and subsequently request that the cloud controller 120 scale up by establishing an additional front-end web server. Various other functions for the application manager 160 will be apparent such as, for example, handling crashed or failing VMs and the subsequent re-deploying of a component previously residing on a crashed or failing VM.

Upon receiving a request to establish or scale, the cloud controller 120 may determine an appropriate location for the requested operation using a user-provided "policy file." As used herein, the term "policy file" will be understood to refer to any definition of segmentation or constraints on the placement of components in an application. For example, a policy file may specify that 60% of front-end servers should be placed in a first segment located in the US, while 40% of front-end servers should be placed in a second segment located in Europe. The policy file may also define various intra- and inter-segment constraints on component placement, as will be described in greater detail below. When establishing or scaling a component, the cloud controller 120 may select a location that is consistent with the various constraints defined in the policy file.

Figure 2:
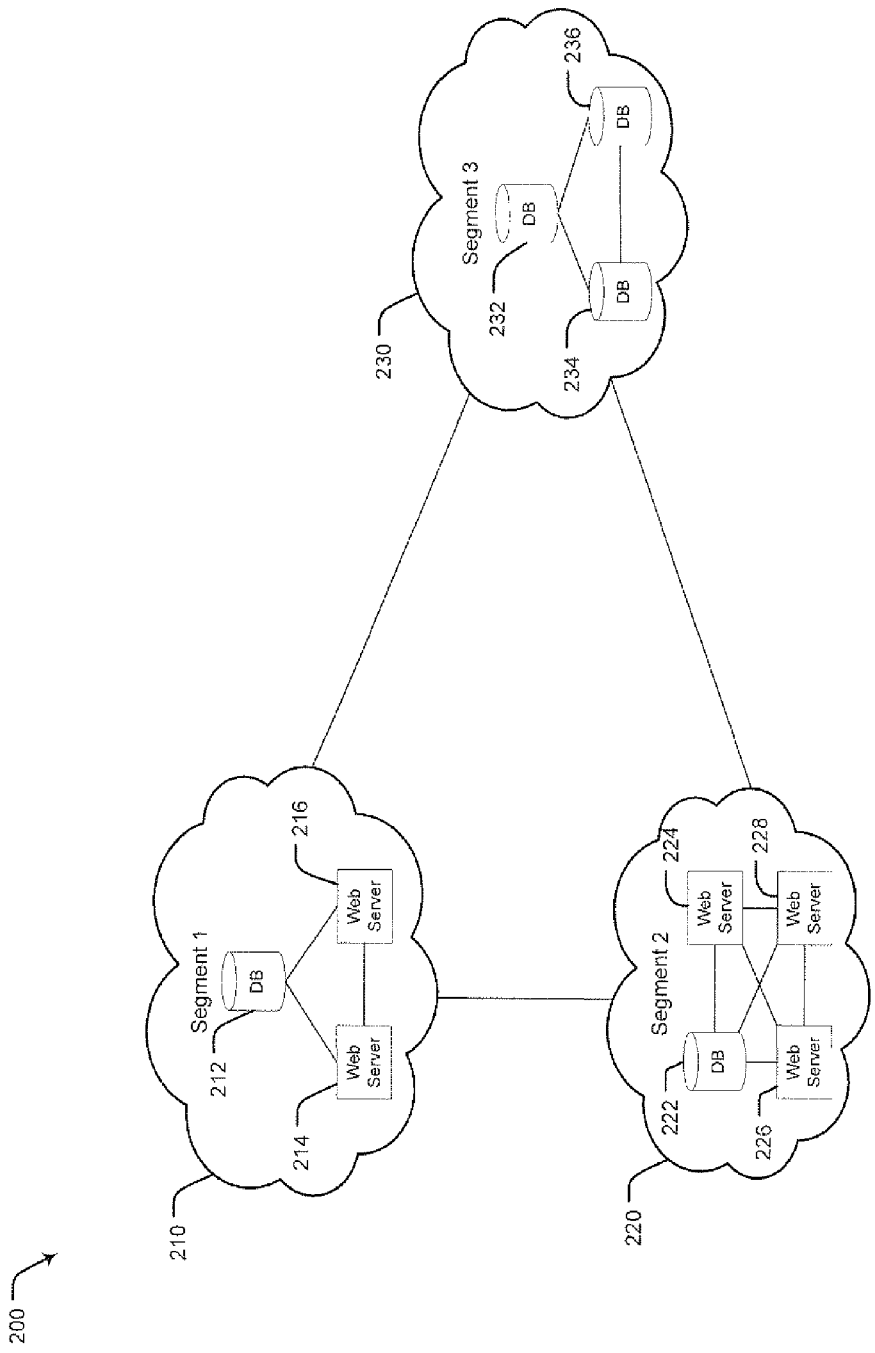
FIG. 2 illustrates an exemplary segmented application.

FIG. 2 illustrates an exemplary segmented application 200. The segmented application 200 may be implemented in a cloud architecture such as, for example, the cloud architecture 100 of FIG. 1. As illustrated, the exemplary application may include five web-severs 214, 216, 224, 226, 228 and five database servers 212, 222, 232, 234, 236. It will be understood that the various components 212, 214, 216, 222, 224, 226, 228, 232, 234, 236 may not be directly connected to one another, as illustrated, and instead may be in communication via one or more networks of intermediate devices such as, for example, the Internet. Further, the components 212, 214, 216, 222, 224, 226, 228, 232, 234, 236 may represent various virtual machines deployed within a cloud architecture for performing varying functions. The various components may be distributed among three segments 210, 220, 230, as specified by a user-provided policy file. A policy file may be defined in various formats such as, for example, extensible markup language (XML), a scripting language, a proprietary policy file markup language, or any other language useful in defining segments and constraints. Such a policy file may read, for example, as follows.

---

PolicyFile.xml

```
< ?xml version = "1.0" encoding = "UTF-9" ? >
< service >
    < applicationName > Example WebApp < /applicationName >
    < segmentsClassDefinitions >
        < segmentClass >
            < name > Europe Segment Class < /name >
            < geography > EU < /geography >
            < availability > 99.999 < /availability >
            < serviceLevel > TIER_3 < /serviceLevel >
        < /segmentClass >
        < segmentClass >
            < name > US Segment Class < /name >
            < geography > US < /geography >
            < availability > 99.995 < /availability >
            < serviceLevel > TIER_2 < /serviceLevel >
        < /segmentClass >
        < segmentClass >
            < name > Backup Database Segment Class < /name >
            < geography > JP < /geography >
            < availability > 99.9999 < /availability >
            < serviceLevel > TIER_1 < /serviceLevel >
        < / segmentClass >
    < / segmentsClassDefinitions >
    < segments >
        < segment name = "Segment 1" class = "Europe
        Segment Class" >
            < affinityRules >
                < affinityRule level = "ZONE" type =
                "AFFINITY" / >
            < /affinityRules >
            < tiers >
                < tier name = "Web Server" percent = "40" / >
                < tier name = "Database Server" percent = "20" / >
            < /tiers >
        < /segment >
        < segment name = "Segment 2" class = "US Segment Class" >
            < affinityRules >
                < affinityRule level = "NODE" type =
                "AFFINITY" / >
```

---

PolicyFile.xml

```
            < /affinityRules >
            < tiers >
                < tier name = "Web Server" percent = "60" / >
                < tier name = "Database Server" percent = "20" / >
            < /tiers >
        < /segment >
        < segment name = "Segment 3" class = " Backup Database
        Segment Class" >
            < tiers >
                < tier name = "Web Server" percent = "0" / >
                < tier name = "Database Server" percent = "60" / >
            < /tiers >
        < /segment >
    < /segments >
    < interSegmentConstraints >
        < constraint >
            < segments >
                < segment name = "Segment 1" / >
                < segment name = "Segment 2" / >
            < /segments >
            < affinityRules >
                < affinityRule level = "NODE" type =
                "ANTI_AFFINITY" >
            < /affinityRules >
        < /constraint >
        < constraint >
            < segments >
                < segment name = "Segment 1" / >
                < segment name = "Segment 3" / >
            < /segments >
            < affinityRules >
                < affinityRule level = "ZONE" type =
                "AFFINITY" >
            < /affinityRules >
        < /constraint >
        < constraint >
            < segments >
                < segment name = "Segment 2" / >
                < segment name = "Segment 3" / >
            < /segments >
            < affinityRules >
                < affinityRule level = "ZONE" type =
                "AFFINITY" >
            < /affinityRules >
        < /constraint >
    < /interSegmentConstraints >
< /service >
```

---

As will be understood, the example policy file defines three segments: segment 1 210, segment 2 220, and segment 3 230. The example policy file also defines the distributions of application components between the segments 210, 220, 230. For example, the policy file specifies that 20 percent of database servers and 40 percent of web servers should be assigned to segment 1. As such, when distributing five database servers and five web servers, the cloud controller 120 may assign one database server 212 and two web servers 214, 216 to segment 1. It will be understood that the specified numbers, percentages, or other proportions for each segment may not always be exactly attainable, in which case the cloud controller 120 may simply choose an assignment distribution that approximates the distribution specified in the policy file. For example, if six web servers were to be established, the cloud controller 120 may place an additional web server (not shown) in segment 1 210 for a 50-50-0 distribution or in segment 2 220 for a 33-67-0 distribution.

In defining the three segments 210, 220, 230, the example policy file also specifies an individual segment constraint for each of the three segments 210, 220, 230. Specifically, within the "<geography>" tag, the policy file specifies a country or other geographical area in which components assigned to each segment 210, 220, 230 are to be established. For example, the policy file specifies that segment 1 210 is to be established within Europe. As such, the cloud controller may establish the components 212, 214, 216 assigned to segment 1 210 among data center 150, located in Paris, and any other data centers (not shown) located in Europe. It will be understood that, in addition to geographic constraints, individual segment constraints may specify other types of constraints. For example, an individual segment constraint may specify that components are to be placed on Linux machines or that a selected machine uses a specific Hypervisor for managing the VMs running on it.

The policy file may also specify two other types of constraints in addition to the individual segment constraints: Intra-segment and inter-segment constraints. Intra-segment constraints may be constraints on where components are placed in relation to other components within the same segment and may be defined within the "<affinityRules>" tags located inside the "<segment>" tags. As shown, the constraints may be defined in terms of NODE-level constraints, wherein each component is held to the constraint with respect to other nodes, or ZONE-level constraints, wherein components belonging to one group (e.g., web servers) are held to a constraint with respect to components belonging to other groups (e.g., database servers). The exemplary constraints also specify whether the constraint type is an "AFFINITY" type or an "ANTI_AFFINITY" type. For AFFINITY type constraints, the cloud controller 120 may seek to place the component relatively close to the other components within the segment. Such a constraint may be useful, for example, to reduce the delay between devices that communicate with each other. It will be understood that the concept of closeness may be defined in terms of geographical distance (e.g., miles), network distance (e.g., hops), commonality of supporting data center, or latency. Conversely, for ANTI_AFFINITY type constraints, the cloud controller 120 may seek to place the component relatively far from the other components within the segment. Such a constraint may be useful, for example, to provide increased coverage in a geographic area or to provide redundant components that have a greater likelihood of being out of range of an event such as a power failure that impacted a primary component. As an example, the policy file specifies a ZONE-level affinity constraint for segment 1 210. In upholding this constraint, the cloud controller 120 may seek to establish web servers 214, 216 as close as possible, while maintaining other constraints, to database server 212. If possible, the cloud controller 120 may establish the web servers 214, 216 within the same data center that supports the database server 212.

Inter-segment constraints may be enforced between components assigned to different segments and may be defined within the "<constraint>" tags located inside the "<interSegmentConstraints>" tags. Inter-segment constraints may define the segments affected by the constraint within the "<segments>" tag and may specify the constraint type within the "<affinityRules>" tag. For example, the policy file may specify that a NODE-level anti-affinity constraint exists between segment 1 210 and segment 2 220. In establishing the application 200, the cloud controller 120 may uphold this constraint by placing the components 222, 224, 226, 228 assigned to segment 2 220 relatively far from the components 212, 214, 216 assigned to segment 1 210. In some situations, the individual segment constraints may already take care of such an inter-segment constraint. For example, here, the policy file specification that segment 1 210 be located in Europe and segment 2 220 be located in the US would possibly ensure that the constituent components are sufficiently far from one another. In various embodiments, the cloud controller 120 may continue to ensure that the components are even further apart by, for example, establishing components at data centers located in Eastern Europe and the Western U.S.

It will be understood that various alternative methods for specifying affinity and anti-affinity constraints may exist. For example, an alternative policy file may specify maximum inter-component distances for affinity constraints and minimum inter-component distances for anti-affinity constraints. Various alternative implementations will be apparent. Further, alternative constraints other than affinity and anti-affinity type constraints may be used. For example, an intra- or inter-segment constraint may specify that components of a segment use a specific cloud standard or hypervisor.

Figure 3:
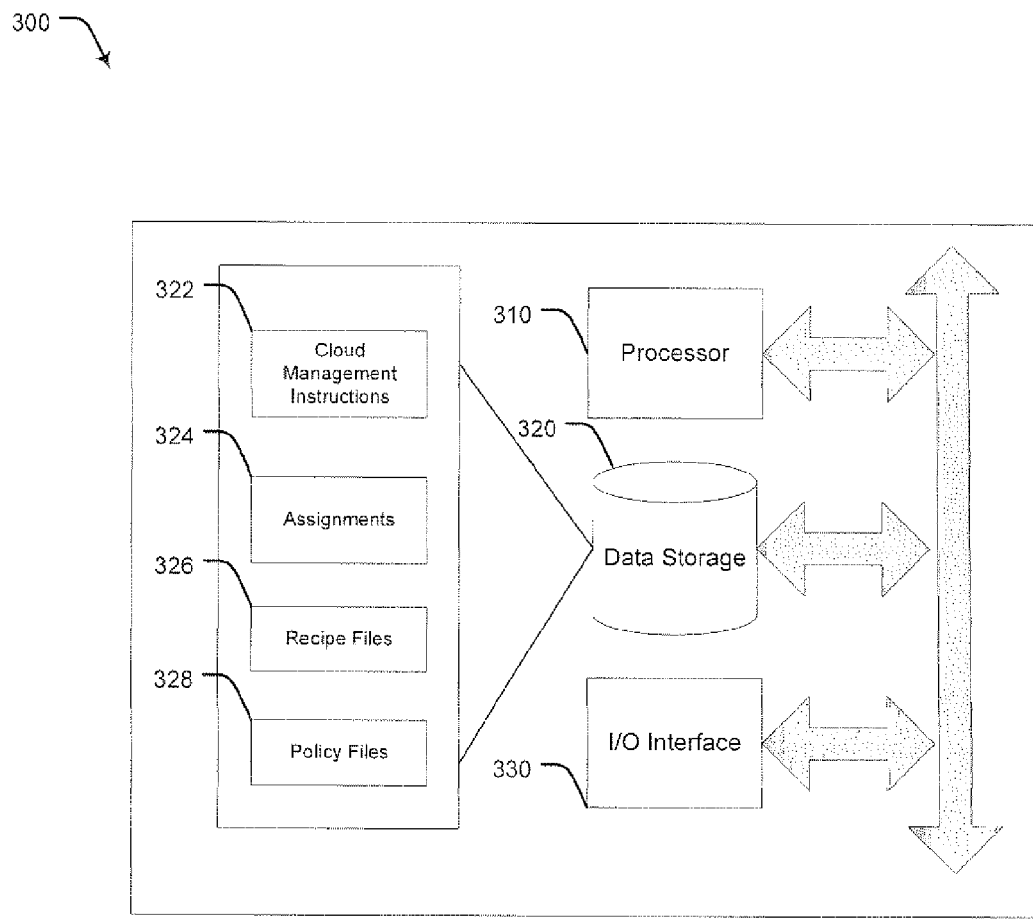
FIG. 3 illustrates an exemplary cloud controller.

FIG. 3 illustrates an exemplary cloud controller 300. The exemplary cloud controller 300 may correspond to the cloud controller 120 of the exemplary cloud architecture 100. The cloud controller 300 may include a processor 310, a data storage 320, and an input/output (I/O) interface 330.

The processor 310 may control the operation of the cloud controller 300 and cooperate with the data storage 320 and the I/O interface 330, via a system bus. As used herein, the term "processor" will be understood to encompass a variety of devices such as microprocessors, field-programmable gate arrays (FPGAs), application-specific integrated circuits (ASICs), and other similar processing devices.

The data storage 320 may store program data such as various programs useful in managing resources in a cloud. For example, the data storage 320 may store cloud management instructions 322 for performing one or more methods such as, for example, those described in connection with FIGS. 4-5 below. The cloud management instructions 322 may include further instructions or methods useful in cooperating with one or more application managers and coordinating the operations of various data centers, hypervisors, or virtual machines.

The data storage may also store records of previous assignments 324. For example, for each component that the cloud controller 300 establishes and assigns to a segment, the cloud controller may store a record among the assignments 324. In this manner, the cloud controller 300 may refer to the previous assignments 324 when provisioning new components to ensure that the proportions specified by the relevant policy file are upheld. In various alternative embodiments, the cloud controller 300 may obtain this system-state information by querying the various data center rather than by storing the system-state information as previous assignments. Further, the cloud controller 324 may store a label identifying the component or segment along with each assignment 324 so that future scaling requests may be performed with respect to the proper segment, as will be described in greater detail below with respect to FIGS. 4-5.

In various embodiments, the cloud controller 300 may also store recipe files 326 and policy files 328 received from the user for future use. In various alternative embodiments, the cloud controller 300 may simply pass one or more of these files 326, 328 to the application manager without storing the file.

The I/O interface 330 may cooperate with the processor 310 to support communications over one or more communication channels. For example, the I/O interface 330 may include a user interface, such as a keyboard and monitor, and/or a network interface, such as one or more Ethernet ports.

In some embodiments, the processor 310 may include resources such as processors/CPU cores, the I/O interface 330 may include any suitable network interfaces, or the data storage 320 may include memory or storage devices. Moreover the cloud controller 300 may be any suitable physical hardware configuration such as: one or more server(s), blades consisting of components such as processor, memory, network interfaces or storage devices. In some of these embodiments, the cloud controller 300 may include cloud network resources that are remote from each other.

In some embodiments, the cloud controller 300 may include one or more virtual machines. In some of these embodiments, a virtual machine may include components from different physical machines or be geographically dispersed. For example, the data storage 320 and the processor 310 may reside in two different physical machines.

In some embodiments, the cloud controller 300 may be a general purpose computer programmed to perform the methods 400, 500.

When processor-executable programs are implemented on a processor 310, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory (s), storage(s), and database(s).

FIG. 4 illustrates an exemplary method 400 for establishing an application within a cloud. Method 400 may be performed, for example, by a cloud controller such as cloud controller 120 or cloud controller 300.

Method 400 may start in step 405 and proceed to step 410 where the cloud controller 120 may receive a recipe file from a user. The recipe file may define a cloud application that the user wishes to be established. Next, in step 415, the cloud controller 120 may receive a policy file from the user. The policy file may define a number of segments and constraints on component placement to be used when establishing and scaling the application defined in the recipe file received in step 410. It will be understood that the cloud controller 120 may receive a file in multiple ways such as, for example, the user uploading the file, the user creating a file with a cloud controller-provided GUI, the user selecting a file resident at the cloud controller 120 or the application manager 160, or the user identifying a file stored elsewhere such as by a URL.

Next, in step 420, the cloud controller 120 may forward the recipe file to an application manager 160. The application manager 160 may then be responsible for coordinating which components should be established or, later, terminated to establish and scale the application with demand. Based on the recipe file, the application manager 160 may send a request to establish one or more components, which the cloud controller 120 may receive in step 425. The application manager may 160 send a single message including multiple requests for components or may send one message per request.

After receiving a request, the cloud controller 120 may, in step 425, select a segment for the new component to be established based on the policy file. In various embodiments, the cloud controller 120 may refer to the policy file to determine the specified division of components of the requested types between each defined segment. Then, based also on how many components of the requested type have also be assigned to each segment, the cloud controller 120 may select a segment for the new component. For example, if the policy file defines a 50-50 split of web servers between segment 1 and segment 2, and only one web server has been established on segment 1, the cloud controller 120 may assign the new web server to segment 2, such that the division is now 50-50 between the two segments.

Next, the cloud controller 120 may identify any constraints for the selected segment in step 435 by referring to the policy file. As previously described, the constraints may include individual segment constraints, intra-segment constraints, and inter-segment constraints. After identifying the relevant constraints, the cloud controller 120 may, in step 440, select a location that is consistent with the identified constraints for placement of the new component. For example, if the segment has an individual segment constraint of "US" and an anti-affinity inter-segment constraint with respect to another segment in Europe, the cloud controller 120 may choose to place the new component in a data center located in San Diego or Seattle over a data center in New York City. After selecting a location, the cloud controller 120 may establish the new component by sending a message to the selected data center instructing a hypervisor or other component to establish the new component. Once the component has been established, the cloud controller 120 may report the establishment back to the application manager 160 with information related to the new components. For example, the cloud controller 120 may provide a name or location of the new component, such that the application manager 160 is enabled to monitor the load or performance of the component and make appropriate scaling decisions. The cloud controller 120 may also provide a label that is useful for the cloud controller 120 to identify the assigned segment at a future time. The label may be a separate label naming the segment or may be integrated into a value already provided to the application manager 160 such as, for example, the component name. The application manager 160 may be configured to store this label and transmit the label back with scaling requests, as will be described in greater detail below with respect to FIG. 5.

After reporting the component establishment, the cloud controller 120 may determine, in step 455, whether additional components remain to be established. For example, the cloud controller 120 may determine whether a previously received message from the application manager 160 includes additional requests or the cloud controller 120 may wait for a period of time for additional messages carrying additional requests. If additional components remain to be established, the method 400 may loop back to step 425. Otherwise, the method 400 may proceed to end in step 460.

FIG. 5 illustrates an exemplary method 500 for scaling an application within a cloud. Method 500 may be performed, far example, by a cloud controller such as cloud controller 120 or cloud controller 300.

Method 500 may begin in step 505 and proceed to step 510 where the cloud controller 120 may receive a scale request from the application manager 160. The scale request may include a request to establish one or more new components or a request to terminate one or more components. The request to establish or terminate may identify one or more existing components requested to be scaled or simply include the label sent to the application manager 160 in step 450 of method 400 when the component to be scaled was initially established. In step 515, the cloud controller may extract this label from the received request and then, in step 520, identify the segment to which the label corresponds. By doing so, the cloud controller 120 may identify the segment to which the component to be scaled was initially assigned.

After identifying the relevant segment, the cloud controller 525 may identify any relevant constraints for the segment based on the policy file corresponding to the application to be scaled. This step 525 may be similar to step 435 of method 400. Then, in step 530, the cloud controller 120 may select a location for the scaling operation that is consistent with the identified constraints. When the scaling operation includes the establishment of a new component, the cloud controller 120 may select a location for this establishment that would be consistent with the constraints. It will be understood that such establishment may violate one or more component distributions defined by the policy file. For example, when a policy file defines a 50-50 distribution of web servers between two segments, and a first segment includes the only current web server, the cloud controller 120 may establish a new web server in the first segment, even though this would not bring the distribution closer to 50-50, because the application manager specifically identified segment 1 as the segment to be scaled. In this way, the cloud controller 120 may ensure that the new component is established in a location where the increased load is being experiences, thus increasing the effect that the newly-established component has on meeting the needs of the increased load.

When the scaling operation includes termination of a component, the cloud controller may, in step 530, select a location of an already-existing component, such that the removal of the component would not cause the remaining components within the segment to violate a constraint. For example, if removing a web server disposed between two other web servers would cause the distance between the two remaining web servers to violate an affinity intra-segment constraint, the cloud server 120 would instead attempt to find another component to be terminated. As with scaling up, the cloud controller 120 may scale down an application such that the component distribution defined by the policy file may not be upheld. For example, if the application manager 160 requests that the web servers in the US segment be scaled down, the cloud controller 120 would seek to remove a web server assigned to the US segment (and therefore likely located in the US), even if doing so would violate the 50-50 distribution specified in the policy file. By doing so, the cloud controller 120 may ensure that resources are not removed from an area that is not experiencing an underutilization and may, instead, need all established resources to keep up with the local demand.

Next, in step 535, the cloud controller 120 may perform the scaling operation at the selected location. For example, the cloud controller 120 may establish a new component or terminate an existing component. Then, in step 540, the cloud controller 120 may report the scaling operation to the application manager. Where the scaling operation included establishing additional components, step 540 may be similar to step 450. As such, the cloud controller 120 may transmit a label identifying the segment to the application manager 160 for use in future scaling operations. The method 500 may then proceed to end in step 545.

According to the foregoing, various embodiments enable a user to request deployment of a distributed cloud application and to influence where the components of the application are placed. By providing for a cloud controller 120 that receives and utilizes a policy file, a user is given the flexibility to divide a distributed cloud application into segments and define various placement constraints for each defined segment. Further, by providing a label identifying a segment to an application manager, future scaling operations may be performed with these constraints in mind. Various additional advantages of the methods and systems described herein will be apparent in view of the foregoing.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a cloud controller for establishing a component of an application within a cloud, the method comprising:
   receiving, from a requesting device, a request to establish the component by the cloud controller:
   identifying by the cloud controller a policy the associated with the application, wherein the policy the defines at least one segment for the application within the cloud and defines at least one constraint for a first segment of the at least one segment, wherein a segment is a grouping of components available for the application within the cloud:
   selecting the first segment for establishment of the component by the cloud controller;
   selecting a location for establishment of the component by the cloud controller, wherein the location is selected to be consistent with the at least one constraint;

establishing the component at the selected location;
receiving, from the requesting device, a request to establish an additional component for the application;
selecting a second segment of the at least one segment for establishment of the additional component; and
selecting a location for establishment of the additional component within the second segment; and establishing the additional component at the selected location, wherein selecting the second segment comprises selecting the second segment for establishment of the additional component based on the policy file definition of the at least one segment and system-state information reflecting the establishment of the component within the first segment.

2. The method of claim 1, wherein the at least one constraint comprises an individual segment constraint that specifies a constraint for components belonging to the first segment.

3. The method of claim 1, wherein the at least one constraint comprises an intra-segment constraint that specifies a constraint between at least two components belonging to the first segment.

4. The method of claim 1, wherein the at least one constraint comprises an inter-segment constraint that specifies a constraint between at least one component belonging to the first segment and at least one component belonging to a second segment of the at least one segment.

5. The method of claim 1, further comprising:
reporting the establishment of the component to the requesting device along with a label;
receiving, from the requesting device, a scale request including the label;
identifying the first segment as being associated with the label; and
performing a scaling operation with respect to the first segment.

6. The method of claim 5, further comprising, after identifying the first segment:
identifying the at least one constraint for the first segment from the policy file; and
selecting a location for the scaling operation, wherein the location is selected to be consistent with the at least one constraint;
wherein performing the scaling operation comprises performing the scaling operation at the selected location.

7. A cloud controller for establishing a component of an application within a cloud, the cloud controller comprising:
a data storage;
a processor in communication with the data storage, the processor being configured to:
receive, from a requesting device, a request to establish the component by the cloud controller;
identify by the cloud controller a policy the stored in the data storage and associated with the application, wherein the policy file defines at least one segment for the application within the cloud and defines at least one constraint for a first segment of the at least one segment, wherein a segment is a grouping of components available for the application within the cloud;
select the first segment for establishment of the component by the cloud controller;
select a location for establishment of the component by the cloud controller, wherein the location is selected to be consistent with the at least one constraint;
establish the component at the selected location;
receive, from the requesting device, a request to establish an additional component for the application;
select a second segment of the at least one segment for establishment of the additional component;
select a location for establishment of the additional component within the second segment; and
establish the additional component at the selected location, wherein, in selecting the second segment, the processor is configured to select the second segment for establishment of the additional component based on the policy file definition of the at least one segment and system-state information reflecting the establishment of the component within the first segment.

8. The cloud controller of claim 7, wherein the at least one constraint comprises an individual segment constraint that specifies a constraint for individual components belonging to the first segment.

9. The cloud controller of claim 7, wherein the at least one constraint comprises an intra-segment constraint that specifies a constraint between at least two components belonging to the first segment.

10. The cloud controller of claim 7, wherein the at least one constraint comprises an inter-segment constraint that specifies a constraint between at least one component belonging to the first segment and at least one component belonging to a second segment of the at least one segment.

11. The cloud controller of claim 7, wherein the processor is further configured to: report the establishment of the component to the requesting device along with a label;
receive, from the requesting device, a scale request including the label;
identify the first segment as being associated with the label; and perform a scaling operation with respect to the first segment.

12. The cloud controller of claim 11, wherein the processor is further configured to, after identifying the first segment:
identify the at least one constraint for the first segment from the policy file; and
select a location for the scaling operation, wherein the location is selected to be consistent with the at least one constraint;
wherein in performing the scaling operation, the processor is configured to perform the scaling operation at the selected location.

13. A non-transitory machine-readable storage medium encoded with instructions for execution by a cloud controller for establishing a component of an application within a cloud, the medium comprising:
instructions for receiving, from a requesting device, a request to establish the component by the cloud controller;
instructions for identifying by the cloud controller a policy file associated with the application, wherein the policy file defines at least one segment for the application within the cloud and defines at least one constraint for a first segment of the at least one segment, wherein a segment is a grouping of components available for the application within the cloud;
instructions for selecting the first segment for establishment of the component by the cloud controller;
instructions for selecting a location for establishment of the component by the cloud controller;
wherein the location is selected to be consistent with the at least one constraint;

instructions for establishing the component at the selected location;

instructions for receiving, from the requesting device, a request to establish an additional component for the application;

instructions for selecting a second segment of the at least one segment for establishment of the additional component;

instructions for selecting a location for establishment of the additional component within the second segment; and instructions for establishing the additional component at the selected location, wherein, in selecting the second segment, the processor is configured to select the second segment for establishment of the additional component based on the policy file definition of the at least one segment and system-state information reflecting the establishment of the component within the first segment.

14. The non-transitory machine-readable storage medium of claim 13, further comprising:

instructions for reporting the establishment of the component to the requesting device along with a label;

instructions for receiving, from the requesting device, a scale request including the label; instructions for identifying the first segment as being associated with the label; and instructions for performing a scaling operation with respect to the first segment.

15. The non-transitory machine-readable storage medium of claim 14, further comprising instructions for, after identifying the first segment:

identifying the at least one constraint for the first segment from the policy file; and selecting a location for the scaling operation, wherein the location is selected to be consistent with the at least one constraint;

wherein performing the scaling operation comprises performing the scaling operation at the selected location.

* * * * *